Feb. 11, 1958   L. A. JOHNSON ET AL   2,823,051
SEALS

Filed Jan. 31, 1955   3 Sheets-Sheet 1

United States Patent Office 2,823,051
Patented Feb. 11, 1958

2,823,051
SEALS

Lloyd A. Johnson, Woodside, Dan A. Christensen, Palo Alto, and Antone D. Martin, Menlo Park, Calif., assignors, by mesne assignments, to Federal-Mogul-Bower Bearings, Inc., Detroit, Mich., a corporation of Michigan Application January 31, 1955, Serial No. 485,009

10 Claims. (Cl. 286—6)

The present invention relates to oil seals, and more particularly to an unique design espectially advantageous in applications experiencing either erratic shaft movements or considerable runout. While there are many applications of this type, there is one in particular where the operating conditions are most severe and where random runout occurs frequently and with abruptness, namely, railway truck journals. Accordingly, the invention will be disclosed in relation to this specific application although it will be appreciated that its various principles have general utility in many like or similar environments.

One of the prime objects of the invention is to provide a composite shaft or journal seal in which each of the several components is especially designed from material best suited to perform the required functions and withstand the conditions to which it is subjected.

One of the particularly troublesome problems solved by the invention is that of providing a diaphragm flexible enough to respond instantly to the shifting of the journal when in use without distorting a light and readily flexible sealing lip structure and at the same time capable of counteracting high torque forces generated by a large diameter rotating journal. No prior construction could meet these seemingly irreconcilable requirements. However, they are completely fulfilled by the present design making use of unique means safeguarding the soft flexible lips against distortion and making use of the journal movement to move a rigid lip supporting ring bodily with the journal. Likewise, the relatively large force required to distort the diaphragm as compared to that required to distort the light sealing lips is transmitted to the diaphragm in a path by-passing the lip by the same unique means protecting the lip.

Of considerable importance is the construction of the inner or sealing rim of the flexible diaphragm. This rim comprises several separately manufactured parts held assembled to the diaphragm in a new advantageous manner. Certain of these parts incorporate materials individually compounded for maximum service life and highest efficiency in respects which will be pointed out in detail in the following portions of this specification. Among the more prominent objects of the lip design, however, is the provision of a resilient lip structure capable of preventing escape of lubricant, excluding grit, water and foreign matter and incorporating long life and effective means affording positive assurance that the resilient lip structure remains concentric with the journal despite erratic and sudden displacements of the journal laterally, axially or angularly, and even though these relative movements span distances and occur at rates heretofore considered to prohibit the use of a resilient sealing lip.

Another special feature of the lip design involves the use of a shaft follower ring of suitable bearing material secured directly to the lip assembly and having a running fit with the journal. The function of this ring is to hold the lip structure concentric with the journal as well as to shift the lip bodily and instantaneously along with the journal with the result that the sealing efficiency of the lip remains substantially constant for both zero or high shaft runout. This follower ring is rigidly confined on its outer diameter as well as its opposite sides, and is operative in cooperation with these restraints to compensate for expansion due to temperature rises thereby maintaining substantially constant clearance with the journal over a wide range of operating temperatures.

Another object is the provision of a unique mode of utilizing a moldable plastic material for the follower ring in order to negative the effect of shrinkage as the ring gradually normalizes after being placed in use. This shrinkage varies widely depending on factors not fully understood, but is fully and automatically compensated for by reason of the design to be disclosed in detail below. As a result, it is practical to assemble newly molded and un-normalized rings into components where dimensions must be maintained to close tolerances throughout the life of the assembly despite shrinkage of the rings during use.

Still another object is the provision of a seal design having certain parts usable interchangeably with journals of widely different sizes and including means for selectively supporting sealing lip components of different sizes depending upon the size of the journal to be sealed.

Yet another object is the provision of an oil seal for a journal having wide-range random movement with respect to its housing and making use of a bellows-like diaphragm. Special means are carried by the rim of the diaphragm for anchoring the same to the housing once the journal has been properly assembled in its operating position while leaving the seal free to shift bodily with the journal during the assembly of the journal with respect to its housing.

A further object is the provision of a seal designed for use on a substantially fully sealed journal assembly and including means for ingress and egress of air without generating foam from the lubricant.

Other objects and advantages of the invention will become apparent from the following detailed description of an illustrative embodiment taken with the accompanying drawings wherein.

Figure 1:
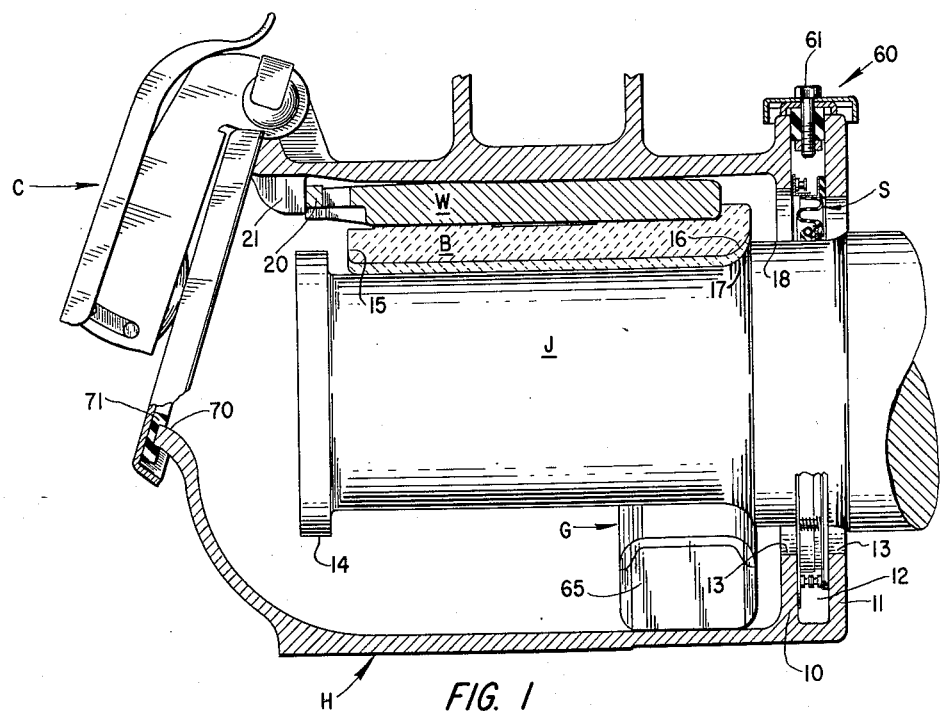
Figure 1 is a vertical section taken lengthwise through a railway truck journal housing showing the seal of the present invention in its normal operating position.

Referring to the drawings, it will be seen that a conventional railway truck journal assembly has been shown in section in Figure 1. Inasmuch as an understanding of the invention can be gained from a consideration of certain details of the journal assembly per se, it was thought unnecessary to illustrate the entire truck, nor even a complete side frame of the truck. It will, of course, be understood that a typical journal housing generally indicated by H is cast integral with either end of the side frame. Each of these housings encloses a trunnion-like truck journal J projecting from the outer face of a truck wheel, not shown. The large area front access opening of the housing is normally closed by a manually releasable cover device generally designated C. Housing H is supported from the top of the journal by a slab-like bearing or brass B and a locking wedge W.

The rear end of the journal housing comprises a pair of closely spaced walls 10 and 11 forming therebetween an open-topped narrow dust guard well 12. Walls 10 and 11 have substantially aligned large diameter openings 13, 13 through which journal J projects. The forward end of journal J is provided with a heavy flange 14 which acts as a stop for the forward end 15 of brass B. The rear rounded end 16 of the brass conforms to a fillet 17 at the rear end of the journal. Fillet 17 merges with a short cylindrical collar 18 commonly known in the industry as the dust guard seating collar. This collar is somewhat longer than the width of the double-walled rear end of housing H. Brass B and the journal are locked in assembled position by means of the wedge W, the front end 20 of which abuts a boss 21 projecting downwardly from the top wall of the housing. The brass has laterally extending flanges cooperating with inwardly projecting lugs from the upper mid-portions of the housing side walls in a manner to limit the rearward movement of the wedge.

The problem solved by the present invention is the sealing of the wide radial gap between the edges of openings 13 through rear end walls 10 and 11 and rotating collar 18 of the journal. Bearing in mind that journal J is held assembled to housing H by the loose fitting brass B and locking wedge W, and the fact that housing H is free to move axially of the journal by one-half an inch or more as well as upwardly or laterally of collar 18 by a like amount at all times and while the journal is operating at high speed, it will be readily appreciated that the problem of providing a long-life fluid-type seal for the collar is a most difficult and challenging one. Such a seal forms the subject matter of this invention and is generally indicated at S in Figures 1 and 2.

Figure 2:
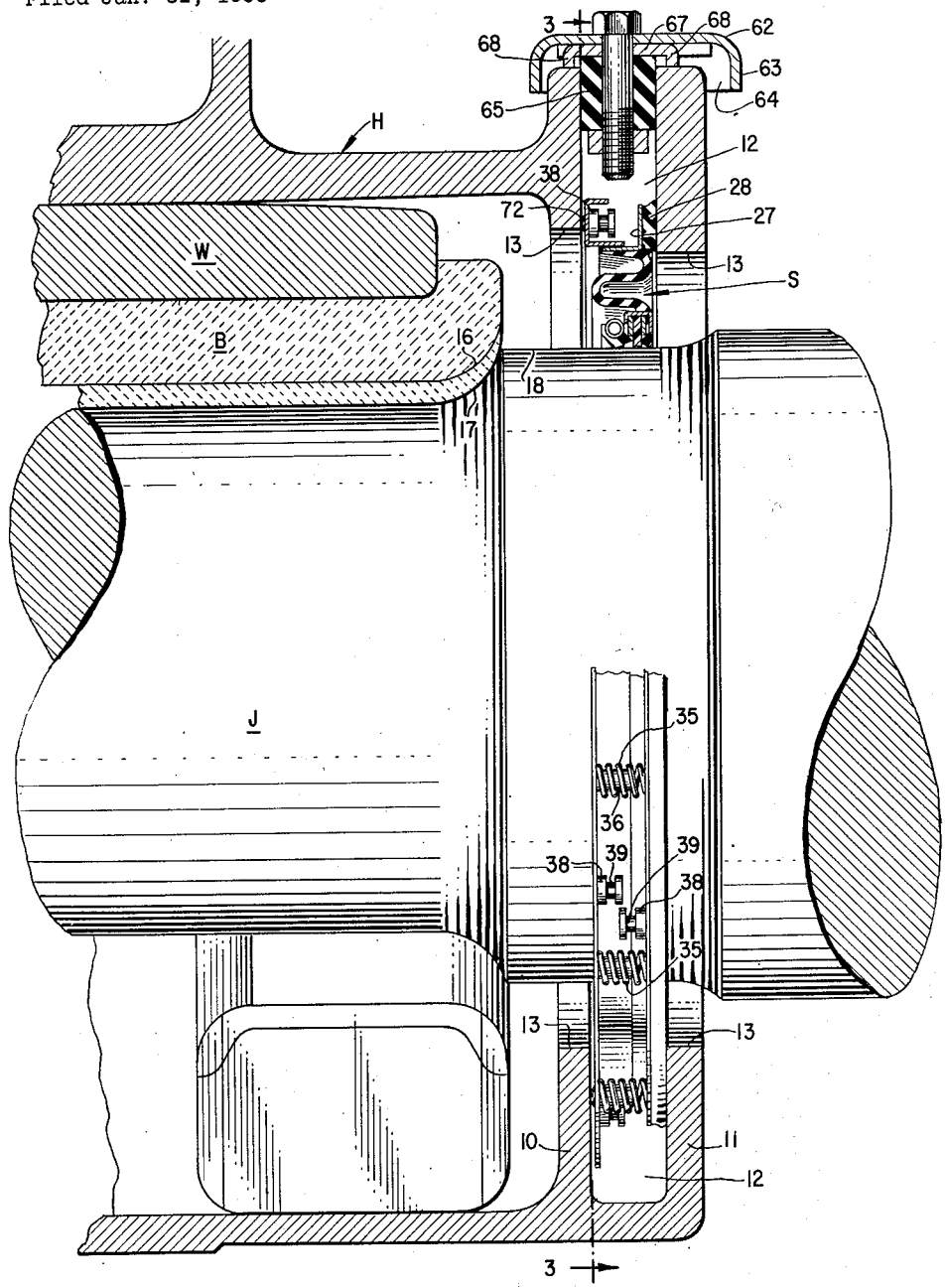
Figure 2 is a fragmentary view similar to Figure 1 but on a larger scale.
Figure 3:
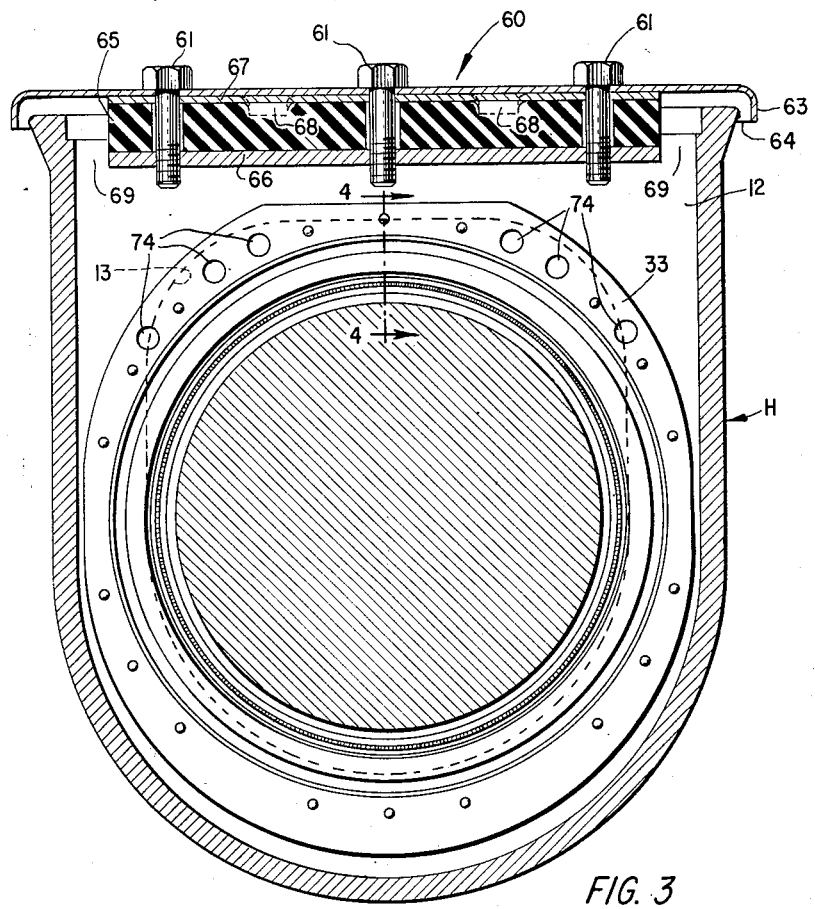
Figure 3 is a sectional view taken crosswise of the journal housing along line 3—3 on Figure 2.
Figure 4:
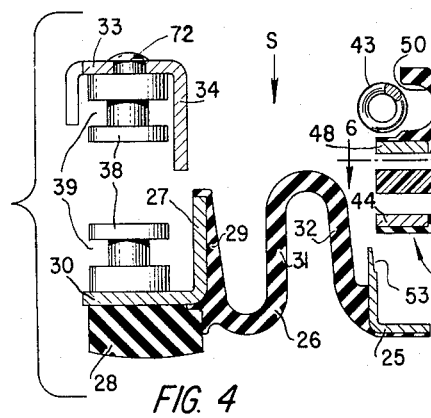
Figure 4 is an exploded sectional view through the seal taken along line 4—4 in Figure 3.
Figure 5:
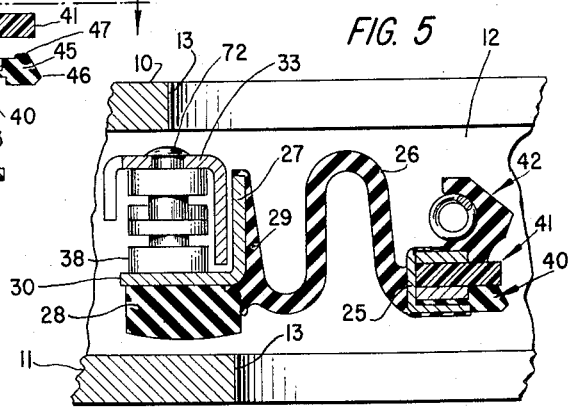
Figure 5 is a view taken similarly to Figure 4 but showing the various components of the seal fully assembled and the rim rings locked in their collapsed position in readiness for installation.

Referring to Figures 2, 4 and 5, it will be seen that the journal seal S comprises a number of components and sub-assemblies. The major sub-assembly includes an inner cupped metal ring 25, a thin-walled radial bellows 26 of a special rubber compound, an outer cupped metal ring 27, and a soft rubber radial gasket ring 28. Bellows 26 is firmly bonded to the outer radial and axial flanges of inner casing ring 25, and its exterior peripheral rim 29 is likewise bonded to the inner axial face of ring 27. Likewise, gasket ring 28 is bonded to the radial flange 30 of ring 27.

Bellows 26 preferably includes two concentric convolutions molded in one piece from a suitable flexible yet tough rubber compound. The material selected should be highly resistant to attack from lubricants, remain flexible over a temperature range of —40° to 250° F., be resistant to cracking and have high torque transmitting strength. Stock prepared principally from synthetic Buna-N type rubber has been found to meet these exacting requirements admirably. As will be appreciated from the drawings, and especially Figures 4 and 5, the two axial webs 31, 32 are sufficiently long to permit casing ring 25 to move radially with relative ease and yet permit the walls of these webs to be thick enough to counteract the strong torque forces produced by the rotation of the journal against the non-rotating lips of the seal.

The means for supporting and anchoring the outer rim of the oil seal in place between walls 10 and 11 of the dust guard well 12 includes a second flanged ring having a radial flange 33 and an axial flange 34 slightly greater in diameter than the corresponding flange of ring 27. Accordingly, the axial flanges of both rings can be telescoped together easily and with sufficient clearance for the passage of fluids such as oil and air. Interposed between radial flanges 30 and 33 of these rings are a number of stiff compression springs 35 held in assembled position by studs 36 riveted or otherwise secured to flange 33. These springs do not appear in Figures 4 and 5 since these views were taken at planes offset circumferentially from the springs. When not restrained, the springs are effective to urge the outer rings apart sufficiently to immovably anchor the rings one against each of the journal housing end walls 10 and 11. However, when the springs are held compressed by a restraining lock to be described in a moment, the total width of the seal rim is appreciably less than the width of well 12. Consequently, the seal can be easily inserted and manoeuvred within the well.

The restraining lock for springs 35 comprises a plurality of pairs of interlocking pins. The pins of each pair are riveted, welded or otherwise secured to the inner faces of flanges 30 and 33 respectively. Each pin is provided with a deep groove 39 of a width easily receiving the narrow head of each pin. A pair of pins is adequate to hold a pair of springs spaced to either side thereof compressed.

The assembly and engagement of the locking pins is accomplished very simply. Ring 33, 34 is supported on a flat surface and springs 35 are inserted over the ends of studs 36. The bellows sub-assembly is next telescoped downwardly over flange 34 of the first ring and under sufficient pressure to compress each of the springs. Thereafter, the bellows sub-assembly is rotated the very slight amount to engage the heads of pins 38 within grooves 39. The restraining and locking action thereby obtained is so reliable that the seals may be assembled in this manner at the factory, packaged, shipped and handled freely in the field without danger of the pins becoming disengaged unintentionally.

The sealing lip assembly of our unique oil seal comprises four separate units; namely, a dust ring 40, a guard ring 41, an oil sealing ring 42, and a garter spring 43. Dust lip 40 comprises a steel washer 44 to one face and the inner diameter of which is bonded a resilient sealing lip preferably formed of a rubber compound which is soft and easily flexed and which is highly resistant to abrasion by cinders, grit and the like. The V-shaped annular sealing lip 46 is in a plane spaced from the outboard face of washer 44 and is formed with a diameter somewhat smaller than the diameter of collar 18 on which it is intended to ride. A very low height annular rib of rubber 47 protrudes axially beyond the face of washer 44 for a purpose which will become apparent presently.

Figure 6:
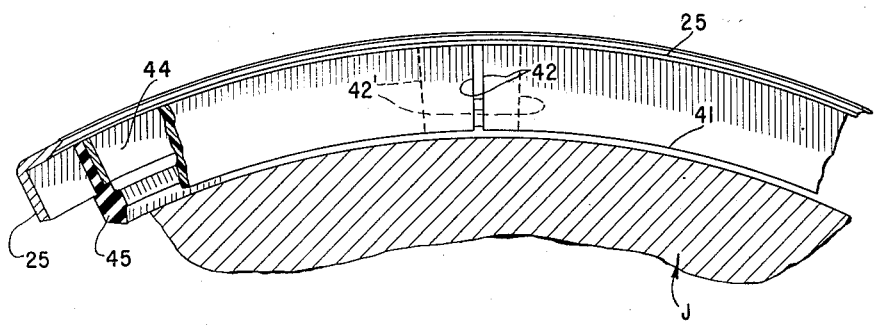
Figure 6 is a fragmentary view taken along line 6—6 on Figure 4 showing certain details of the follower ring design.

The next element of the lip sub-assembly comprises a rigid guard ring 41 split radially at 42 as shown in Figure 6 to provide a one-piece discontinuous ring. The function of this ring is to provide a rigid strut between the journal surface and the axial flange of the metal ring 25 which, it will be recalled, is bonded to the inner periphery of bellows 26. While ring 41 can be made of any suitable bearing material, a non-metallic material such as one of the plastics has been found by experience to give superior results. A plastic known under the trade-name of nylon is especially suitable due to its excellent bearing characteristics as well as its resilient rigidity. Certain of its other characteristics present problems such as its high temperature coefficient of expansion and its tendency to shrink during successive heating and cooling cycles after being placed in use. Split 42 permits the ring to be molded with a diameter somewhat greater than the inner diameter of the axial flange of ring 25. Hence, it must be contracted slightly for assembly in ring 25, whereupon it expands outwardly firmly against the wall of the ring leaving a gap 42 between its ends approximately .015 to .020 inch in width. This gap is quite adequate to take care of expansion caused by the heat of friction at the sealing lips.

Particular attention is called to Figure 6 showing the inner rim of guard ring 41 as having a diameter approximately ten thousandths of an inch greater than that of journal J. Hence, normally the sealing lips carried by rings 40 and 42 hold the guard ring 41 out of contact with the rotating journal. However, a slight sidewise movement of the journal in an abrupt manner causes the journal to engage the edge of the guard ring which then acts as a radial strut to force inner casing ring 25 to move bodily with the journal. As the sidewise movement of the journal ceases, the resilient sealing lips act instantly and automatically to re-center ring 25 concentrically of the journal.

The main oil sealing lip 42 includes a metal washer 48 identical with washer 44 and a resilient soft rubber oil sealing lip 49 bonded to the face and inner diameter of the washer. Lip 49, like dust lip 45, is preferably made from still a different rubber compound than any of the other rubber parts with a view to obtaining the most efficient and long-life seal possible for its particular operating environment. The compound selected should provide a lip which is soft, pliant, highly resistant to attack by oil, and which is not adversely affected by either high or low temperature operating conditions. It will be noted that its exterior wall is provided with a deep groove 50 to seat a garter spring 43 having its center located over the edge of V-shaped sealing lip 51. This lip is offset axially of washer 48 and connected thereto through a flexible annular web 52. And, of course, the unstressed diameter of lip edge 51 is slightly less than the diameter of journal collar 18 in accordance with conventional sealing lip design practice.

The outer diameters of rings 40 and 42 are selected to telescope easily into the cupped ring 25. Hence, assembly of the lip units can be accomplished quickly after which they are anchored firmly in place by curling over the chamfered rim portion 53 of ring 25. The thin rubber layers on the faces of washers 44 and 48 cooperate with the curled-in rim 53 of the case to clamp the several rings and casing 25 together in a fluid-tight relation.

It will be noted that as the several rings are clamped into case 25, axial rib 47 on the dust lip is placed under compression against guard ring 41 for the purpose of biasing dust lip 46 outwardly away from oil sealing lip 51. Except for this precaution, it has been found that the dust lip has a tendency to be curled inwardly against the guard ring as the journal is inserted through the sealing ring during the assembly of the seal onto the journal. When this occurs, it is very likely to go undetected. But even if detected, it is difficult to shift the lip onto its proper operating position without injuring it. Rib 47, however, places enough axial bias on the dust lip to prevent its inward curling, or to correct the condition automatically if and when it does occur.

*Assembly of oil seal to journal housing*

The installation of the oil seal in a railway truck journal housing is accomplished expeditiously as follows: Jacking up one end of the railway car, the crew removes the king-pin and rolls the truck from beneath the car. A hoist is then employed to raise the side frame and journal housing approximately one-half an inch above wedge W so that end 20 of the locking wedge can be slid forwardly past boss 21. After removing brass B in the same manner, journal J can be withdrawn rearwardly from housing H. The dust well cover 60 is then removed after first loosening its clamping screws 61.

The fully-assembled seal S with outer rings 27 and 34 locked in their fully-nested position by locking pins 38 is inserted downwardly through the open top of well 12. In this connection, care is taken to have the dust lip 40 and the soft sealing gasket ring 28 face outwardly toward wall 11 of the well. Since springs 35 are held tightly compressed by pins 38, the sealing ring slides freely into the well. Holding it centered in openings 13, 13 of the rear end wall, the crew then inserts flange 14 of the journal through the seal until the journal is approximately half way into the housing. The housing is then lowered until its top wall rests against journal flange 14.

A pair of arcuate-shaped guard bearing members G are then individually installed into the opposite rear corners of the journal housing with their lower ends 65 abutting one another in mutually supporting relation directly below the center line of journal J. The construction and general purpose of these members is to restrict the relative movement of housing H with respect to journal J thereby safeguarding the sealing lip structure and its supporting bellows from injury which would otherwise occur. Another important function is to protect seating collar 18 from injury by coming into contact with the rough cast edges of openings 13. A detailed description of these guard bearings and their relationship to other parts of the assembly is fully disclosed in the co-pending application of Dan A. Christensen and Clifford A. Stephens, Serial No. 476,678, filed on or about December 21, 1954, and having the same assignee as the present application.

Having installed the guard members, the crew elevates the housing until the journal is cradled against the bottom of the bearing surface of the guard bearings G and shifts the journal axially into its normal operating position with respect to housing H. Brass B and locking wedge W are then reinstalled in reverse order over the top edge of flange 14. The housing may now be lowered so that it is supported by the journal through brass B and wedge W.

Seal S is now supported in its normal operating position on collar 18 with its outer metal rings 27, 34 supported concentrically of the collar by bellows 26. However, the sealing gasket 28 is not sealed against outer wall 11, nor are either of the outer rings immovably anchored against the side walls of well 12 as they should be. To accomplish the anchoring operation, the operator inserts a special tool through the top of well 12 into engagement with the nearest pair of locking pins 38 and shifts them in opposite directions just sufficiently to disengage their heads. This allows springs 35 to snap flanges 33 of the larger ring firmly against inner wall 10 of the well and to compress gasket 28 tightly against the rough cast face of outer wall 11. Thereafter, rings 27, 34 and the outer rim of bellows 26 is immovably anchored to the walls of well 12 and cannot be shifted with respect thereto by any operating condition. Bellows 26, of course, permits rather wide-range axial and radial movement of the sealing lip structure, although it will be understood that guard members G serve to restrict the radial movement of the journal relative to housing H materially over what it would otherwise be.

*The dust guard well cover and its function*

Cover 60 for the dust guard well 12 comprises a sheet metal stamping 62 with a downturned flange 63. The area of this cover is appreciably larger than the cross-sectional area of the well housing to provide a narrow air passageway 64. The means herein shown for clamping the cover in place over the well and in spaced relation to its rim may comprise a block of soft rubber 65 considerably shorter than the longer length of the cover and of a width having a sliding fit with side walls 10 and 11 of the well. Cap screws 61 extend through a metal stamping 67 having down-struck tabs 68 along its opposite edges which contact the top edge of the well rim and serve to support cover plate 62 spaced vertically above the well rim. The lower ends of screws 61 fit in threaded holes of a metal strip 66.

The resilient rubber clamping block 65, when not compressed vertically, fits freely between the side walls of the well. During its installation, the cover is pressed downwardly until tabs 68 contact the rim of the well. Cap screws 61 are then tightened into the keeper strip 66 thereby compressing rubber clamp 65 and forcing its opposite sides outwardly into snug engagement with the side walls of the well. The narrow air passageway 64 around the entire rim of cover 62 communicates directly with the larger air passages 69 at either end of the clamping block 65, and the latter open downwardly into well 12.

The axial movement of journal J into and out of housing H may be compared to the movement of a piston in a cylinder since it changes the volume of the free air space within the housing. This change can be as high as 40 cubic inches if brass B is badly worn and the journal moves from one extreme position to the other. If cover device C for the front access opening 70 of the journal housing is clamped tightly closed and sealed by a resilient gasket 71, as it should be, then air cannot enter or escape at this point and it goes without saying that the fluid-tight lips of oil seal S will or should not permit flow of air at this point. And, of course, any appreciable pressure difference on the opposite sides of the bellows diaphragm 26 would interfere with its proper operation and might easily result in its injury or premature failure of its sealing function.

It will be recalled that only the outer exterior rim of the bellows diaphragm is held sealed against the outer wall of well 12 by the aid of a soft rubber gasket 28. It will likewise be recalled that flange 34 of the metal clamping rings for the seal fits loosely within flange 27 of the other ring. Moreover, the riveted head 72 of locking pins 38 (see Figures 2 and 4) serve to space radial flange 53 slightly from inner side wall 10 of the well. While the passageways thus provided suffice for the passage of considerable air, experience has demonstrated that these narrow passageways tend to trap films of oil. The passage of air through these films causes excessive foaming of the oil. This foaming has been substantially eliminated by the provision of a number of large area openings 74 in the upper corners of the inner radial flange 33 of the seal clamping ring. As a result, the air flows freely through these openings as it enters or leaves the interior of the journal housing leaving the narrow passages between the flanges of the rings and the walls of the housing free for the return of oil to the reservoir.

It will be quite apparent from the foregoing discussion that a considerable volume of air can enter or leave the journal housing through the tortuous passage provided at the upper portion of the dust guard well. This flow can occur as speedily as necessary to prevent any appreciable pressure difference across the flexible bellows diaphragm 26 of the oil seal. Moreover, the air passageways are so formed that dirt, dust and other foreign matter including water are effectively excluded. If by chance any should flow past passageways 64 and 69, the construction of the seal will prevent any such foreign matter from entering the reservoir section of the housing and it will collect in the bottom of the dust guard well 12.

*Operation*

In accordance with long-standing practice, the bottom portion of housing H acts as an oil reservoir. Normally, it would be filled with oil to a level in the vicinity of the lower edge of openings 13 in the rear end wall. However, since the present seal S provides a fluid-tight seal against collar 18, the oil level may be raised appreciably above the lower edge of opening 13, if so desired. Inasmuch as the means employed for transferring oil from this pool to the journal and the other operating parts forms no part of the present invention, none has been illustrated in the drawings. While various types of lubricating devices and expedients may be employed, we prefer to employ one of the type disclosed in our copending application for United States Letters Patent, Serial No. 415,468, filed on or about March 11, 1954, entitled Mechanical Lubricant Circulator. The type of oil circulator therein disclosed assures thorough lubrication of the journal and its brass as well as of the guard bearing members G and all parts of collar 18 and the inner walls of seal S. This excess flow of lubricant is most important to carry away the heat of friction thereby greatly prolonging the life and effectiveness of the oil sealing lips and to prevent deterioration of the rubber bellows member.

There are several aspects of the oil seal which were not discussed above because their significance arises after the seal has been in operation for a period of time. Reference is had to the guard ring 41 for the oil seal and the fact that nylon, of which it is preferably made, has a very decided shrinkage characteristic as it ages. This shrinkage is commonly known as normalizing and is greatly accelerated if the nylon is subjected to repeated heating and cooling cycles. This, of course, occurs naturally during the use of ring 41 in the oil seal since the normal operating temperature of the journal box under load not infrequently rises to 175° F. If ring 41 were continuous, its inner rim would shrink and grip the journal. The consequences of this are rather obvious in that something would have to give. The inner metal case ring 25, together with washers 44 and 48, might be seriously warped thereby pulling the lips out of sealing contact. Equally serious is the fact that the seizure of the journal would undoubtedly result in the irreparable rupture of the sealing diaphragm.

These disastrous results cannot occur with the present construction by reason of split 42 in guard ring 41 since any tendency to grip collar 18 results in the slight spreading and outward expansion of the ring. Upon the first abrupt sidewise shifting of the journal, the inner edge of guard ring 41 will be contacted by the journal and its outer edge will be pushed into engagement with the side wall of casing ring 25 and this radial repositioning of ring 41 will take place despite the frictional pressure applied to the opposite sides of the ring by dust ring 40 and sealing lip ring 42. Subsequent radial thrust forces on other portions of the ring will likewise move them outwardly against ring 25.

This restoring action will take place as many times as the guard ring shrinks away from the casing ring. As a matter of fact, we have found that the guard ring never does shrink into actual contact with the journal because of this constant and automatic restoration of the ring to its proper operating position each time it starts to shrink away from it.

Over a period of use, split 42 will gradually open until it is quite wide as indicated by 42' in Figure 6. The width of gap 42' is somewhat exaggerated but it does become quite wide without any adverse effects whatever. This is particularly true if the gap is positioned at the top of the seal when it is installed in the journal housing since the relative movement of the journal and its housing is a minimum in this area.

Another distinct advantage of the split 42 in the guard ring and the mode of supporting the ring is that these features permit the ring to expand and contract circumferentially without placing any particular stress upon the adjacent parts of the seal. For example, as the ring expands due to a temperature rise, gap 42 closes. Cooling of the ring and its consequent contraction may or may not result in the radial displacement of the ring. But this is immaterial since, if it does contract, the first sudden displacement of the journal will strike the inner edge of the ring and re-seat it against the outer wall of casing ring 25. There is still another aspect of the present invention of considerable importance from an economic and manufacturing standpoint. This springs from the fact that there are a number of standard journal sizes in general use. These vary from one another by small to major fractions of an inch, but sufficiently to require a different sealing and dust lip assembly as well as a different guard ring. In fact, according to prior practice it would be necessary to manufacture a different seal for each different size. Each of these sizes would require a complete set of manufacturing tools including molds and assembly jigs. The tremendous cost involved is self-apparent. Also, it is quite common to re-surface the seating collars 18 whenever they become injured in service. This re-surfacing naturally decreases the diameter and requires a sealing lip with a smaller internal diameter.

The present invention provides a simple mode of greatly minimizing the expense of providing a multitude of seals each fitting a different size seating collar. This is achieved by so designing the major sub-assembly of the seal for use with journal seating collars 18 of maximum diameter and in using this same major sub-assembly for all or substantially all seal sizes. This sub-assembly includes inner case 25, bellows 26, mounting rings 27, 34, locking pins 38 and expansion springs 35. The only parts which must be specially made to fit the particular size collar with which the seal is to be used include dust ring 40, guard ring 41, oil sealing ring 42, and garter spring 43. The first three of these components have identical outer diameters while their inner diameters are selected to fit a particular size seating collar. In fact, the only respect in which they need differ from one another is in their radial dimension.

Among the other advantages of this multiple component seal design is the fact that a faulty component of the sealing lip section of the seal does not mean the rejection and the discarding of the entire seal structure. Instead, the faulty component is merely replaced with a perfect one and casing ring 25 is closed to lock the parts in assembled position.

It is self-evident that numerous changes in construction and the selection of materials can be made in practicing the invention without departure from the essential principles outlined above. These changes will suggest themselves to those skilled in the art to which this invention relates without departing from the spirit or scope of the invention.

We claim:

1. An oil seal assembly for use in sealing the radial gap between a rotating journal and a housing therefor comprising, a rigid outer frame for anchoring the seal assembly against a housing wall adjacent the edge of a journal opening therethrough, a cupped ring of rigid material spaced radially inwardly of said frame, a readily flexible ring bellows having its outer rim sealed to said frame and its inner rim sealed to said cupped ring, a plurality of rings nested within said cupped ring including a flexible sealing lip and a follower ring closely adjacent said sealing lip having an inner diameter slightly greater than the journal diameter for which said sealing lip is designed whereby said follower ring will normally operate out of contact with a true operating journal but will move the sealing lip ring bodily with the journal upon the lateral displacement of the journal.

2. An oil seal assembly as defined in claim 1 wherein the plurality of rings nested within said cupped ring includes a second flexible sealing lip, said follower ring being supported between the two said flexible sealing lips.

3. An oil seal assembly as defined in claim 1 wherein said follower ring is formed of a plastic material having long wearing characteristics as a bearing element subject to contact with a rotating journal.

4. An oil seal assembly as defined in claim 2 in which the two sealing lips are snugly nested within said cupped ring and against the opposite radial faces of said follower ring, one of said lips being made of flexible resilient material resistant to wear from dust and dirt and adapted to face outwardly from a journal housing, and the other of said sealing lips being made of resilient synthetic rubber material resistant to journal lubricants and adapted to face inwardly toward the interior of a journal housing.

5. An oil seal assembly as defined in claim 4 wherein one of said sealing lips has an annular rib projecting axially from a radial face thereof and adapted to be compressed during the assembly within said cupped ring whereby said one sealing lip is biased in a predetermined axial direction.

6. An oil seal adapted for use on a journal subject to random runout in use, said seal comprising a readily flexible diaphragm ring of concentric convolute form having low resistance to radial deflection from forces applied to one rim thereof but having high torque transmitting strength between the inner and outer rims thereof, a pair of relatively soft and flexible annular sealing lip rings made of elastomeric material different from said diaphragm, non-metallic rigid guard ring means positioned between said sealing lip rings and having an inner diameter slightly in excess of that of a journal for which said oil seal is designed, and means holding said rings secured in side-by-side relation and to the inner rim of said diaphragm rim, said last named means cooperating with said guard ring means to protect said flexible sealing lips against distortion under random runout journal operating conditions.

7. An oil seal as defined in claim 6 wherein said guard ring is formed of plastic material and having a split extending thereacross to form a non-continuous one-piece member whereby said ring is free to open to maintain a substantially constant diameter as the plastic material shrinks upon repeated heating and cooling.

8. The oil seal as defined in claim 6 wherein the sealing lip rings comprise an outer disk-like dust-sealing lip facing the exterior of said journal housing and an inner flexible oil-sealing ring having a rigid radially extending clamping flange and an inwardly projecting flexible sealing lip spring biased against the journal.

9. An oil seal for use in forming a fluid-tight running seal between a rotating journal and a hollow wall through which the journal projects, said seal comprising a flexible ring diaphragm, an axially expandible mounting ring assembly secured to the outer rim of said diaphragm, said assembly being contractible to a width such that said seal will slide edgewise readily within said hollow wall, said assembly being expandable to seal the rim of the diaphragm against said hollow wall, a multi-part sealing lip assembly secured to the inner rim of said diaphragm, said lip assembly including a rigid supporting ring bonded to the diaphragm, a rigid bearing ring having an inner diameter slightly greater than the diameter of the journal for which it is designed, a plurality of resilient sealing lip rings and means for securing said bearing ring and sealing lip rings to said rigid supporting ring.

10. An oil seal as defined in claim 9 wherein said mounting ring assembly includes a pair of axially movable ring members, a plurality of expansion springs supported between said rings and urging the same in opposite directions axially of the seal, one of said rings having openings therethrough for the passage of air between the interior of a hollow journal housing wall and the interior of the housing proper.

References Cited in the file of this patent

UNITED STATES PATENTS

| | | |
|---|---|---|
| 2,080,472 | Grece | May 18, 1937 |
| 2,103,555 | Rowe | Dec. 28, 1937 |
| 2,257,119 | Johannesen | Sept. 30, 1941 |
| 2,358,536 | Reynolds | Sept. 19, 1944 |
| 2,657,080 | Johnson et al. | Oct. 27, 1953 |
| 2,783,067 | Foss | Feb. 26, 1957 |